US007200633B2

(12) United States Patent
Sekiguchi et al.

(10) Patent No.: US 7,200,633 B2
(45) Date of Patent: Apr. 3, 2007

(54) INFORMATION DELIVERY SYSTEM AND INFORMATION DELIVERY METHOD

(75) Inventors: Shunichi Sekiguchi, Kanagawa (JP); Minoru Etoh, Kanagawa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 901 days.

(21) Appl. No.: 09/935,889

(22) Filed: Aug. 23, 2001

(65) Prior Publication Data
US 2002/0083157 A1 Jun. 27, 2002

(30) Foreign Application Priority Data
Aug. 25, 2000 (JP) ............................. 2000-256494

(51) Int. Cl.
*G06F 15/16* (2006.01)
(52) U.S. Cl. ...................... 709/203; 709/217; 709/219; 455/332
(58) Field of Classification Search ................ 709/203, 709/217, 219, 223, 229, 231
See application file for complete search history.

(56) References Cited

U.S. PATENT DOCUMENTS

| | | | |
|---|---|---|---|
| 5,835,087 A | 11/1998 | Herz et al. ................... 345/327 |
| 5,958,006 A | 9/1999 | Eggleston et al. ........... 709/219 |
| 5,995,095 A * | 11/1999 | Ratakonda ................ 715/500.1 |
| 6,016,509 A | 1/2000 | Dedrick ........................ 709/224 |
| 6,044,205 A | 3/2000 | Reed et al. ............ 395/200.31 |
| 6,065,058 A * | 5/2000 | Hailpern et al. ............. 709/231 |
| 6,138,158 A * | 10/2000 | Boyle et al. ................. 709/225 |
| 6,272,492 B1 * | 8/2001 | Kay .............................. 707/10 |
| 6,421,781 B1 * | 7/2002 | Fox et al. ........................ 726/4 |
| 6,505,160 B1 * | 1/2003 | Levy et al. ................... 704/270 |
| 6,557,042 B1 * | 4/2003 | He et al. ...................... 709/231 |
| 6,618,763 B1 * | 9/2003 | Steinberg .................... 709/246 |

(Continued)

FOREIGN PATENT DOCUMENTS

EP    0737930 A1    10/1996

(Continued)

OTHER PUBLICATIONS

Digestor: Device-Independent Access to the World Wide Web Timothy W. Bickmore, Bill N. Schilit 1997.

(Continued)

*Primary Examiner*—Ario Etienne
*Assistant Examiner*—LaShonda Jacobs
(74) *Attorney, Agent, or Firm*—Workman Nydegger

(57) ABSTRACT

An information delivery system and information delivery method can provide information delivery services that utilize network resources efficiently. A push server 3 transmits data associated with summary content 15 (summary of detailed content 23) to a push delivery controller 2, and a terminal 1 transmits data associated with the terminal 1 to the push delivery controller 2. According to these data, the push delivery controller 2 decides the terminal to which the summary content is to be transmitted, and notifies the push server 3 of the terminal. The push server 3 transmits the summary content to the terminal notified. When the terminal 1 wishes to acquire the detailed content corresponding to the received summary content, it sends to the pull server 4 a request to transmit the detailed content. In response to the request, the pull server 4 transmits the detailed content to terminal 1.

29 Claims, 7 Drawing Sheets

U.S. PATENT DOCUMENTS

| | | | |
|---|---|---|---|
| 6,654,786 B1 * | 11/2003 | Fox et al. | 709/203 |
| 6,704,295 B1 * | 3/2004 | Tari et al. | 370/270 |
| 6,745,226 B1 * | 6/2004 | Guedalia | 709/203 |
| 6,829,781 B1 * | 12/2004 | Bhagavath et al. | 725/94 |

FOREIGN PATENT DOCUMENTS

| | | |
|---|---|---|
| GB | 2324669 A | 10/1998 |
| JP | 09-091358 | 4/1997 |
| JP | 10-021165 | 1/1998 |
| JP | 10-134038 | 5/1998 |
| JP | 11-136365 | 5/1999 |
| JP | 11-195065 | 7/1999 |
| WO | WO97/37462 | 10/1997 |
| WO | WO 97/41654 | 11/1997 |
| WO | WO99/31610 | 6/1999 |
| WO | WO 99/52247 | 10/1999 |
| WO | WO 99/66673 | 12/1999 |
| WO | WO00/02148 | 1/2000 |
| WO | WO 00/02403 | 1/2000 |

OTHER PUBLICATIONS

Converting PC Guis for NonPC Devices Dan Johnson Feb. 1998.

Official Notice of Rejection (Translation) Case No. DCMH130241 Patent Application No. 2001-256659.

Mobile Information Service Based on Multi-Agent Architecture Nobutsugu Fujino, Takashi Kimoto and Ichiro Iida Oct. 1997 pp. 1401-1406.

IEEE Personal Communications, "Dynamic Adaptation in an Image Transcoding Proxy for Mobile Web Browsing" Richard Han, Pravin Bhagwat, Richard LaMaire, Todd Mummert, Veronique Perret, and Jim Rubas IBM T.J. Watson Research Center Dec. 1998, vol. 5 No. 6 pp. 1, 8-17.

International Organization for Standardization Organisation Internationale Normalisation ISO/IEC JTC 1/SC 29/WG11 Coding of Moving Pictures and Audio Mar. 2000, Noordwijkerhout pp. 1-137.

The Platform for Privacy Preferences 1.0 (P3P1.0) Specification W3C Working Draft May 10, 2000 Lorrie Cranor, Marc Langheinrich, Massimo Marchiori, Martin Presler-Marshall, Joseph Reagle.

POIX: Point of Interest Exchange Language Specification W3C Note- Jun. 24, 1999 Kanemitsu et al.

Composite Capability/Preference Profiles (CC/PP): A User Side Framework for Content Negotiation W3C Note, Jul. 27, 1999 Reynolds et al.

"Wireless Application Group User Agent Profile Specification" WAG UAPROF Version, Nov. 10, 1999 Wireless Application protocol Forum, Ltd. 1999.

Journal of Visual Communication and Image Representation Yehoshua Y. Zeevi, C.C. Jay Kuo vol. 10, 1999.

* cited by examiner

INFORMATION DELIVERY SYSTEM AND INFORMATION DELIVERY METHOD This application claims priority under 35 U.S.C. 119 to patent application No. 2000-256494 filed Aug. 25, 2000 in Japan, the content of which is incorporated hereinto by reference.

BACKGROUND OF THE INVENTION

1. Field of the Invention

The present invention relates to an information delivery system, server, push delivery control unit, charging center, information delivery method, display control method, program and recording medium.

2. Description of the Related Art

Recently, information delivery services for delivering various content have been carried out.

However, delivering the content (particularly, large volume content such as motion picture image content) as it is will consume a lot of network resources, resulting in a low efficiency.

SUMMARY OF THE INVENTION

In view of this, an object of the present invention is to provide an information delivery service capable of utilizing network resources efficiently.

In order to accomplish the above mentioned object, in the first aspect of the present invention, there is provided an information delivery system including a first server, a second server and a terminal, wherein the first server comprises: means for storing summary content which is a summary of detailed content; and means for transmitting the summary content to the terminal, wherein the second server comprises: means for storing the detailed content; and means for transmitting the detailed content to the terminal in response to an instruction of the terminal, and wherein the terminal comprises: means for receiving the summary content from the first server; means for displaying the received summary content; means for instructing the second server to transmit the detailed content corresponding to the received summary content; and means for receiving the detailed content corresponding to the received summary content from the second server.

Here, the information delivery system may further comprise a push delivery control unit, the terminal may further comprise means for transmitting data about the terminal to the push delivery control unit, the first server may further comprise means for transmitting data about the summary content to the push delivery control unit, the push delivery control unit may comprise: means for receiving the data about the terminal from the terminal; means for receiving the data about the summary content from the first server; means for deciding a terminal to which the summary content is to be transmitted according to the data about the terminal and the data about the summary content; and means for transmitting to the first server, information about the terminal which was decided to be the terminal to which the summary content was to be transmitted, and the first server may transmit the summary content only to the terminal which was decided by the push delivery control unit to be the terminal to which the summary content was to be transmitted.

Here, the terminal may further comprise means for transmitting data about the terminal to the first server, the first server may further comprise: means for receiving the data about the terminal from the terminal; and means for deciding a terminal to which the summary content is to be transmitted according to the data about the terminal and data about the summary content, and the first server may transmit the summary content only to the terminal which was decided to be the terminal to which the summary content was to be transmitted.

Here, the data about the terminal may include data about content display capability of the terminal, and the data about the summary content may include data about display capability needed for displaying the summary content.

Here, the data about the terminal may include data about a position of the terminal, and the data about the summary content may include data about a position associated with the summary content.

Here, the data about the terminal may include data about a user of the terminal, and the data about the summary content may include data about attribute associated with the summary content.

Here, the summary content may include a display control code for controlling display of content on the terminal, and the display control code may control display of content on the terminal according to data about the terminal that differs from the data about the terminal which the terminal transmits.

Here, the detailed content corresponding to the summary content may consist of moving image content, and the summary content may include a frame of the moving image content.

Here, the summary content may include data describing a structure of the detailed content corresponding to the summary content.

Here, the summary content may include a display control code for controlling display of content on the terminal.

Here, the display control code may control display of content on the terminal according to the data about the terminal.

Here, the summary content may include structure description data describing a structure of the detailed content corresponding to the summary content, and the display control code may obtain information for receiving the detailed content according to the structure description data and control display of content on the terminal by using the obtained information.

Here, the summary content may include data for authenticating the summary content.

Here, the information delivery system may further comprise a charging center for charging for communication between the terminal the second server.

Here, the charging center may decide a charging destination for the communication between the terminal and the second server according to an instruction from the second server.

Here, when the second server receives information about exemption of the charging from the terminal, the second server may instruct the charging center to charge the second server for subsequent communication with the terminal.

Here, the summary content may include the information about the exemption of the charging, or information about generating the information about the exemption of the charging.

Here, the second server may instruct the charging center to charge the second server for communication with the terminal, after completing the communication.

Here, when the charging center receives information about exemption of the charging from the terminal, the charging center may charge the second server for subsequent communication between the terminal and the second server.

Here, the terminal may be a mobile terminal.

In the second aspect of the present invention, there is provided a server comprising: means for storing summary content which is a summary of detailed content; and means for transmitting the summary content to a terminal.

Here, the server may further comprise: means for receiving data about a terminal from the terminal; and means for deciding a terminal to which the summary content is to be transmitted according to the data about the terminal and data about the summary content, and the server may transmit the summary content only to the terminal which was decided to be the terminal to which the summary content was to be transmitted.

In the third aspect of the present invention, there is provided a push delivery control unit comprising: means for receiving data about a terminal from the terminal; means for receiving data about summary content from a server that stores the summary content which is a summary of detailed content; means for deciding a terminal to which the summary content is to be transmitted according to the data about the terminal and the data about the summary content; and means for transmitting to the server, information about the terminal which was decided to be the terminal to which the summary content was to be transmitted.

In the fourth aspect of the present invention, there is provided a terminal comprising: means for receiving summary content which is a summary of detailed content from a first server that stores the summary content; means for displaying the received summary content; means for instructing a second server to transmit the detailed content corresponding to the received summary content; and means for receiving the detailed content corresponding to the received summary content from the second server.

In the fifth aspect of the present invention, there is provided a charging center comprising: means for charging for communication between a terminal and a server storing content; and means for receiving an instruction from the server, wherein the charging center decides a charging destination according to the instruction from the server and charges the decided charging destination.

In the sixth aspect of the present invention, there is provided a charging center comprising: means for charging for communication between a terminal and a server storing content; and means for receiving information about exemption of the charging from the terminal, wherein the charging center charges, when the charging center receives the information about exemption of the charging from the terminal, the server for subsequent communication between the terminal and the server.

In the seventh aspect of the present invention, there is provided an information delivery method in an information delivery system including a first server that stores summary content which is a summary of detailed content, a second server that stores the detailed content, and a terminal, the information delivery method comprising the steps of: transmitting the summary content from the first server to the terminal; displaying on the terminal the received summary content received by the terminal; instructing the second server to transmit the detailed content corresponding to the summary content received by the terminal; and transmitting the detailed content corresponding to the summary content received by the terminal from the second server to the terminal.

In the eighth aspect of the present invention, there is provided a display control method for controlling display of content on a terminal, comprising the steps of: obtaining information for receiving content according to structure description data describing a structure of the content; and controlling display of content on the terminal by using the obtained information.

In the ninth aspect of the present invention, there is provided a program that makes a terminal to execute a display control method for controlling display of content on the terminal, the display control method comprising the steps of: obtaining information for receiving content according to structure description data describing a structure of the content; and controlling display of content on the terminal by using the obtained information.

Here, the display control method may obtain the information for receiving content according to the structure description data and data about the terminal.

In the tenth aspect of the present invention, there is provided a recording medium for recording a program that makes a terminal to execute a display control method for controlling display of content on the terminal, the display control method comprising the steps of: obtaining information for receiving content according to structure description data describing a structure of the content; and controlling display of content on the terminal by using the obtained information.

The foregoing configuration can provide information delivery services that can make effective use of the network resources. It can also push content effectively and easily which include audio-visual media stimulating the five senses, and which aim to advertise commercial products and stores and to promote other entities. Thus, it can provide users with visual selecting means of the content.

The above and other objects, effects, features and advantages of the present invention will become more apparent from the following description of embodiments thereof taken in conjunction with the accompanying drawings.

DETAILED DESCRIPTION OF PREFERRED EMBODIMENTS

An embodiment in accordance with the present invention will now be described in more detail with reference to the accompanying drawings.

Figure 1:
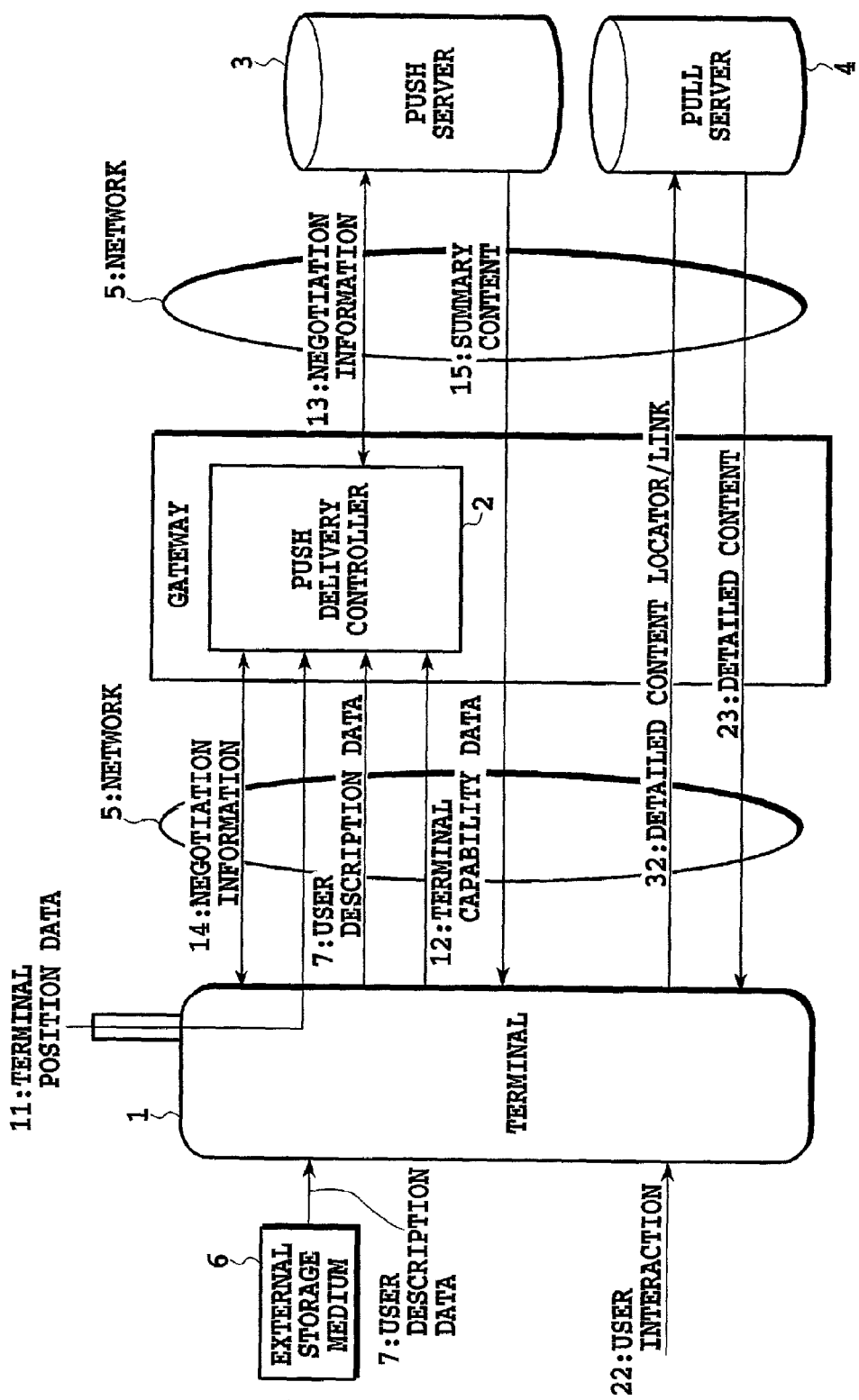
FIG. 1 is a block diagram showing a configuration of an information delivery system of an embodiment in accordance with the present invention.

FIG. 1 is a block diagram showing a configuration of an information delivery system of the embodiment in accordance with the present invention. The information delivery system can deliver multimedia web content including audiovisual (AV) media efficiently by customizing them according to users r environments. The information delivery system comprises a terminal 1, a push delivery controller 2, a push server 3 and a pull server 4, as its main components.

In the information delivery system,the push server 3 delivers summary content to the terminal 1 by push, the summary content being a summary of detailed content and stored in the push server 3. The terminal 1 displays the received summary content. The summary content is displayed in a form that links for the pull operation are provided.

The detailed content stored in the pull server 4 is delivered in response to a pull (transmission request) from the terminal 1. Thus, watching the summary content, the user of the terminal 1 can send a transmission request to the pull server 4 only when he or she wishes to acquire the detailed content.

Figure 7:
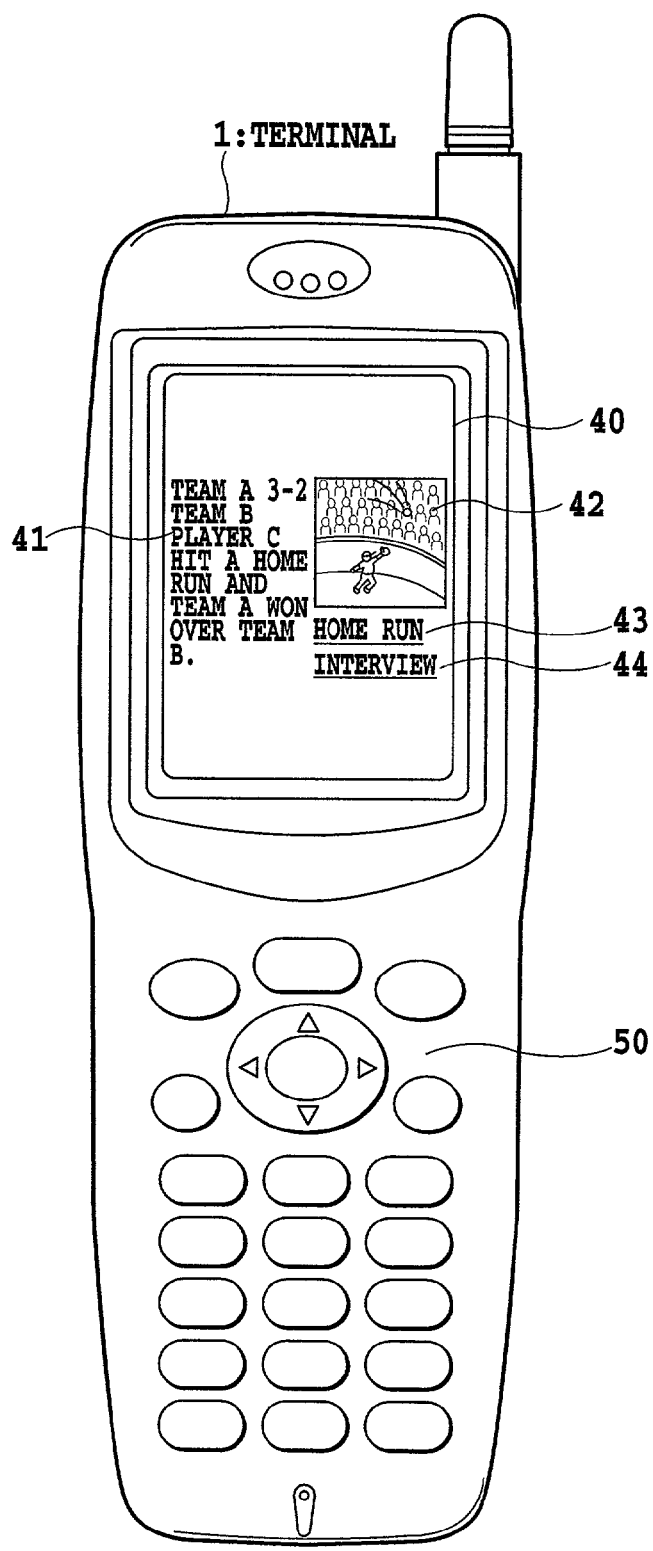
FIG. 7 is a diagram showing an example in which summary content is displayed on a terminal.

FIG. 7 is a diagram showing an example in which summary content is displayed on the terminal 1. In regard to baseball, a headline 41, a headline picture 42 and links 43, 44 are displayed on a liquid crystal display 40 of the terminal 1. If a user want to watch detailed content of "home run", the user can operate buttons 50 to select the link 43. When the link 43 is selected, the terminal 1 sends a transmission request of the detailed content of "home run" to the pull server 4 which stores the detailed content. Receiving the transmission request, the pull server 4 transmits the detailed content of "home run " to the terminal 1. Then, the terminal 1 displays the received detailed content of "home run".

Although it is assumed that the push delivery controller 2 transmits (pushes) only summary content such as one that the user of the terminal 1 will be interested in to the terminal 1 in the present embodiment, it can send all the summary content without setting such a limit.

The terminal 1, having an Internet access function, can receive and display multimedia web content produced in a prescribed format through the network 5. Although the terminal 1 may be a fixed personal computer, mobile information terminal or mobile terminal with an Internet function, the present embodiment assumes a mobile terminal. Furthermore, assuming that the push delivery controller 2 is connected to the push server 3 and pull server 4 via the Internet, and to the terminal 1 through a mobile-specific network (such as a WAP (Wireless Application Protocol) network), the push delivery controller 2 can be considered as a functional block inside the gateway between the two networks.

It is further assumed that the user supplies the terminal 1 with user description data 7 stored in an external storage medium 6 like an IC card in advance. The user description data 7 includes the following information, for example.

Personal information about the user (age, sex, address, etc.)

Genres of the content the user wants to view (sport, music, economy, etc.)

Content performers the user likes (names of actors or actress, of singers, etc.)

The user description data 7 are protected such that they cannot be updated except for such cases as the user intends to rewrite them, or allows them to be automatically rewritten. In addition, it is assumed that the user description data 7 are not transmitted outside the terminal 1 unless the user allows it. To achieve this, the terminal 1 comprises a user description management section 8 for protecting and managing the user description data 7 (see, FIG. 2). The user description management section 8 has the following functions.

User authentication function (Compare the unique information about the user which is stored in the terminal 1 in advance with the input user description data 7).

Update function of the user description data 7 according to a request from the user.

Supporting function of creating new user description data.

Setting function of data access control by the user (automatic update, and transmission to outside).

Automatic update and external transmission function of the user description data 7 in a range permitted.

Interface function with the access from a content display control code 19 which will be described later.

According to the foregoing functions, the user description data 7 are roughly divided into private data 9 and public data 10. The private data 9 are user description data that cannot undergo the automatic update or external transmission. In contrast, the public data 10 are user description data the system can apply the automatic update to or transmits to the outside of the terminal such as the push server 3 via the network 5. The following formats are applicable to the user description data: User Preferences DS ("Multimedia Description Schemes XM", http://www.cselt.it/mpeg/public/mmds_xm.zip) which is currently for standardization by MPEG-7 (Moving Picture Experts Group 7); and P3P (Platform for Privacy Preferences Project, "The Platform for Privacy Preferences 1.0 (P3P 1.0) Specification ", W3C Working Draft 10 May 2000, http://www.w3.org/TR/P3P/) which is currently for standardization by W3C.

The terminal 1 transmits the following data to the push delivery controller 2 via the network 5 when establishing a session needed for the push delivery by this system in a prescribed coding language such as XML (Extensive Markup Language): The public data 10 in the user description data 7; terminal position data (data about the position at which the terminal is present) 11 acquired by a position identifying technique such as the GPS (Global Positioning System); and data about the medium display processing capability (terminal capability data 12) of the terminal.

The terminal position data 11 can use a format such as POIX (Point Of Interest eXchange Language, "POIX: Point Of Interest eXchange Language Specification", W3C Note-24 Jun. 1999, http://www.w3.org/TR/poix/) which is currently for standardization by W3C (World Wide Web Consortium); and Place DS of MPEG-7. The terminal capability data 12 can use a format such as CC/PP (Composite Capability/Preference Profile, "Composite Capability/Preference Profiles (CC/PP); a user side framework for content negotiation", W3C Note 27 Jul. 1999, http://www.w3.org/TR/NOTE-CCPP/) which is currently for standardization by W3C; and User Agent Profile in WAP forum (UAPROF, "Wireless Application Group User Agent Profile Specification", Version 10, November, 1999, http://www1.wapforum.org/tech/documents/WAP-174-UAProf-19991110-a.pdf).

First, a session setup procedure needed for the push delivery will be described. The push server 3 is connected to the Internet, and notifies the push delivery controller 2 of a fact that it is ready for the push delivery (delivery request) by negotiation information 13. Receiving the delivery request from the push server 3, the push delivery controller 2 inquires of all the target terminals to receive the services whether they are ready for accepting the push delivery by means of negotiation information 14. Making a decision to accept the delivery, the terminal 1 establishes the session according to the negotiation information 14, and transmits the user description data 7 (only the public data 10), terminal position data 11, and terminal capability data 12 to the push delivery controller 2.

On the other hand, the push server 3 also transmits the following content-associated information to the push delivery controller 2 along with a delivery request by means of the negotiation information 13. It is preferable that these items of information have the same format as the data transmitted from the terminal 1 to facilitate the comparison.

Data about terminal capability required to display the content to be pushed.

Position data associated with the content (such as area information included in the content).

Various items of attribute information associated with the content (genres of the content, famous names in the content, characters of the content such as for the young/old, men/women, etc.)

The push delivery controller 2 compares the user description data (public data 10), terminal position data 11 and terminal capability data 12 which are transmitted from the terminal 1 with the content-associated information transmitted from the push server 3, selects the terminals with appropriate receiving conditions, and makes a decision as to whether the delivery is acceptable or not. When terminals with the appropriate receiving conditions are not included in the target terminals to receive the services, the push delivery controller 2 notifies the push server 3 of the fact that the delivery is impossible using the negotiation information 13. According to the foregoing procedures, the user of the terminal 1 can receive the appropriate push delivery in accordance with his or her interest or positional condition.

The push delivery controller 2 can be configured such that it can cache the user description data 10, terminal position data 11, and terminal capability data 12 to be used for the services for a predetermined time period. The cached data can be rewritten or erased in response to a request from the terminal. For example, the terminal 1 may request the update of the terminal position data 11, when the position of the terminal 1 changes with the move of the user, and the rate of the movement is very large such as moving by car. Besides, the push delivery controller 2 may erase the content of the cache to make effective use of the cache resources, when the user does not utilize the service for more than the predetermined time, or when the service terminates.

As for the user description data 10, terminal position data 11, and terminal capability data 12, the push server 3 can receive and utilize them to select the detailed content. In such a configuration, a site that can deliver various content can further arrange the content to undergo the push delivery in the push server 3, thereby generating the delivery content specialized for the user. In such a case, the site can generate the content that will release the push delivery controller 2 from the need for selecting the delivery destination or for making a decision as to the acceptability of the delivery, thereby offering an advantage of being able to reduce the processing load of the push delivery controller 2.

The push server 3 must deliver the content including information that requires a great volume of network resources such as AV media. Accordingly, it transmits only the summary of the content (called "summary content 15" from now on) to the user rather than delivering the entire content. The summary content 15 includes a device enabling the user to gain access to more detailed content or to the information associated with the content.

Figure 3:
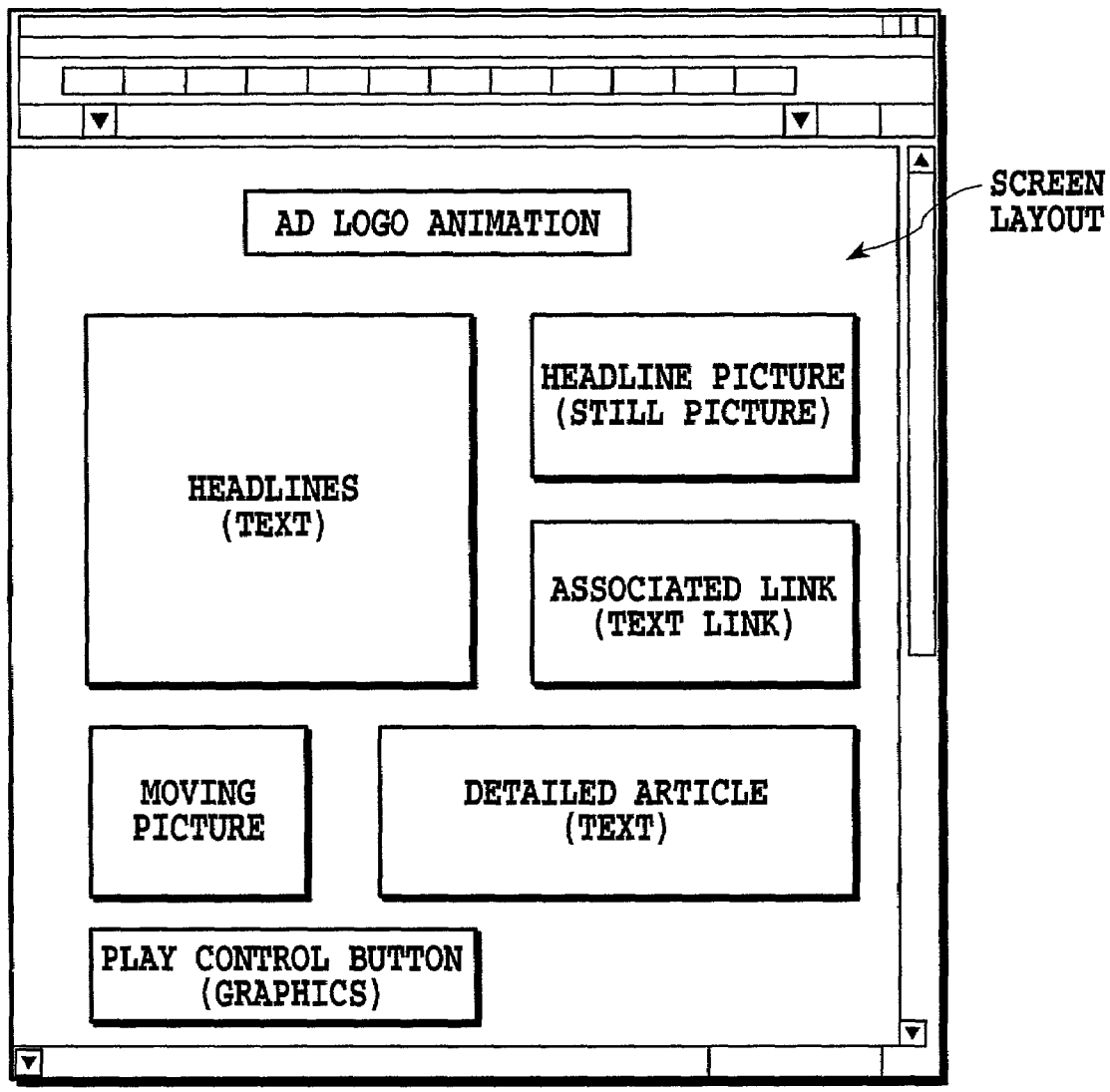
FIG. 3 is a diagram showing an arrangement of a page of multimedia web content.

The structure of the summary content 15 will now be described taking an example of delivering news content. For example, complete multimedia web content for the news delivery have a page structure as shown in FIG. 3. A page includes headlines and detailed report of the news in a text region. In addition, it has a picture for representing a specific headline in the form of still picture data such as JPEG. Furthermore, it offers the content of moving pictures (including accompanying audio in almost all cases). To achieve the reproduction or to specify the link destination of the moving pictures intuitively, graphics such as icons plus buttons are utilized. In addition, to display advertisements of sponsors of the page, animation can be used. To place these various types of media in the screen, it is common to use a display description language typified by HTML (Hypertext Markup Language) to make page description using appropriate authoring tools.

From the standpoint of a content provider, it is preferable that such content be delivered to all devices having an Internet browser. However, it is necessary for the content to be adapted to the display capacity of each device to deliver the content to devices such as mobile terminals with limited display capacity and screen size. For example, R. Han, et al. propose a technique to carry out dynamic adaptation of the content by the proxy of a network in "Dynamic Adaptation in Image Transcoding Proxy for Mobile Web Browsing" (IEEE Personal Communications, Dec. 1998). For example, to deliver the content of FIG. 3 to the browser loaded on the mobile terminal, a first page is made of the headlines only, and the adaptation of the content is carried out such that links lead to their details in the form of "one-to-multiple pages" (For example, "Portal-To-Go" of Oracle Corp.). On the other hand, from the viewpoint of the load of the system, it is undesirable to carry out the dynamic adaptation individually to deliver the content to a variety of terminals. To provide services with reduced system load, it will be rather advantageous to select or format the content to be delivered according to the types of selected terminals by preparing a plurality of types of the content according to the specific terminal standards expected as the target terminals of the services, or by storing common content elements in a specified database to format them only to display at the access time.

Incidentally, since the AV media for displaying moving pictures require a great amount of network resources for transmitting them, they are usually provided in the format as shown in FIG. 3, in which only the initial frame is displayed in a still image, and a click of a reproduction button can start a streaming delivery as needed. It is difficult for the method, however, to efficiently deliver the content with a variety of topics like news delivery by the AV media. Thus, they are limited to only auxiliary use to supplement specific topics. However, to transmit the AV media in their entirety, it is unavoidable to consume more network resources than are necessary in proportion to the amount of information.

Figure 4:
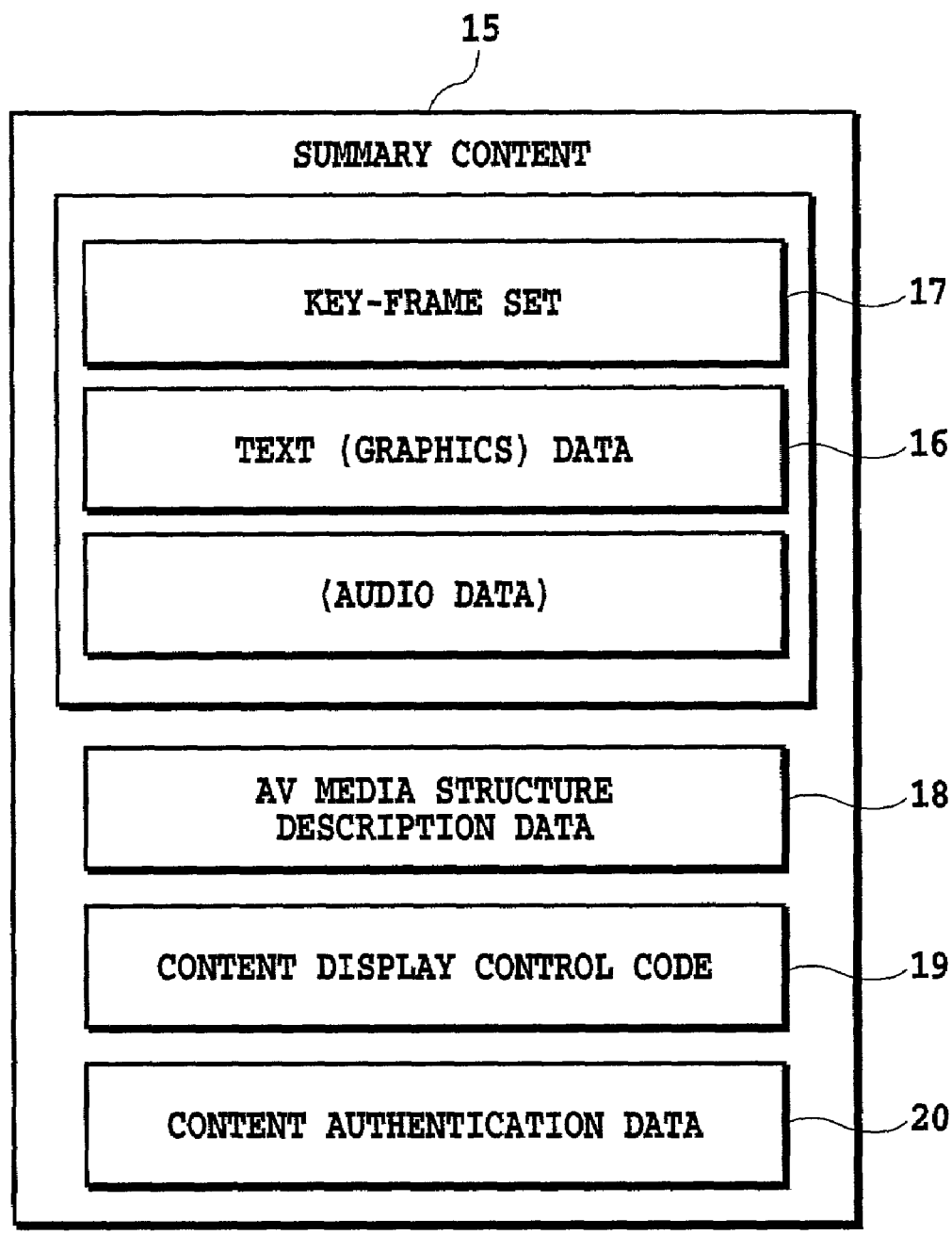
FIG. 4 is a diagram showing a configuration of summary content of the embodiment in accordance with the present invention.

To solve the problems, the present invention composes the summary content 15, which are delivered from the push server 3 to the terminal 1, of the following items of information, thereby making it possible to deliver visually self-explanatory summary content by positively setting the AV media at the center (see, FIG. 4).

text data 16 (including simple graphics data such as icons).

key-frame set 17 of the AV media.

AV-media-structure description data 18.

content display control code 19.

content authentication data 20.

The summary content 15 with the structure enables visual content browsing centered on the images consisting mainly of the key-frame set 17. The text data 16 is used as required minimum for describing events indicated by the key frames (a meaning of the content whose representative images are key frames). Since they are statements of the key frames themselves, they can be considered to be part of the AV-media-structure description data 18 that will be described later.

The AV-media-structure description data 18 describes the physical-semantic structure of the full AV media (detailed content) stored in the pull server 4. The data 18 describes the time when each key frame is present in the full AV media, and the events associated with the key frames included in the summary content.

As for the content display control code 19, a scheme can be used in which the code 19 is transmitted in such a form as Java Applet, and operates on a Java execution environment (Java VM) on the receiving terminal. The functions of the content display control code 19 include the following.

Controlling layout development of the key-frame set 17 and text data 16 on the browser of the terminal 1.

Carrying out display control considering user description data (mainly private data 9) that have been input to the terminal 1 (such as displaying interested items on a priority basis, filtering display information considering the private data 9, etc.).

Unwrapping the structure description data 18, managing the logical relationships (such as corresponding time and corresponding key events) between the received key-frame set 17 and the full AV media stored in the pull server 4, and controlling responses to user interaction 22.

The content authentication data 20 is used to verify whether the delivered summary content 15 is right content delivered in response to the request from the user to prevent a third party from inputting wrong content to the terminal 1. This is implemented by transmitting the summary content using MIME (Multipurpose Internet Mail Extensions), for example, and by utilizing the authentication procedure provided by MIME.

Receiving the delivered summary content 15 with the foregoing format, the terminal 1 can visually browse the key events in the content in the form of image data consisting mainly of the key frames. In addition, since the summary content 15 includes a code for carrying out the key frame display control for the browser, it is not necessary for the terminal to comprise any other components than the Java execution environment.

In this embodiment, the summary content 15 which is composed of the above mentioned information. However, it is possible to leave the information other than the content display control code 19 of the summary content 15 on the push server 3, and make the content display control code 19 obtain the information by interacting with the push server 3 only when the content display control code 19 needs the information.

As for the extraction of the key-frame set 17, it is expected to be performed automatically to some extent based on the existing research results during the content authoring. For example, R. Brunelli, et al., introduce many techniques in "A Survey on the Automatic Indexing of Video Data" (Journal of Visual Communication and Image Representation 10, 1999). Thus, the summary content 15 can be generated when the automatic extraction of the key frames and the smart interactive operation associated with the key events are supported in the authoring tool. The present embodiment does not include any content authoring system.

Information included in the summary content 15 such as the content display control code (program) 19 can be written into a recording medium (for example, CD-ROM, magnetic disk) and read from the recording medium.

Figure 2:
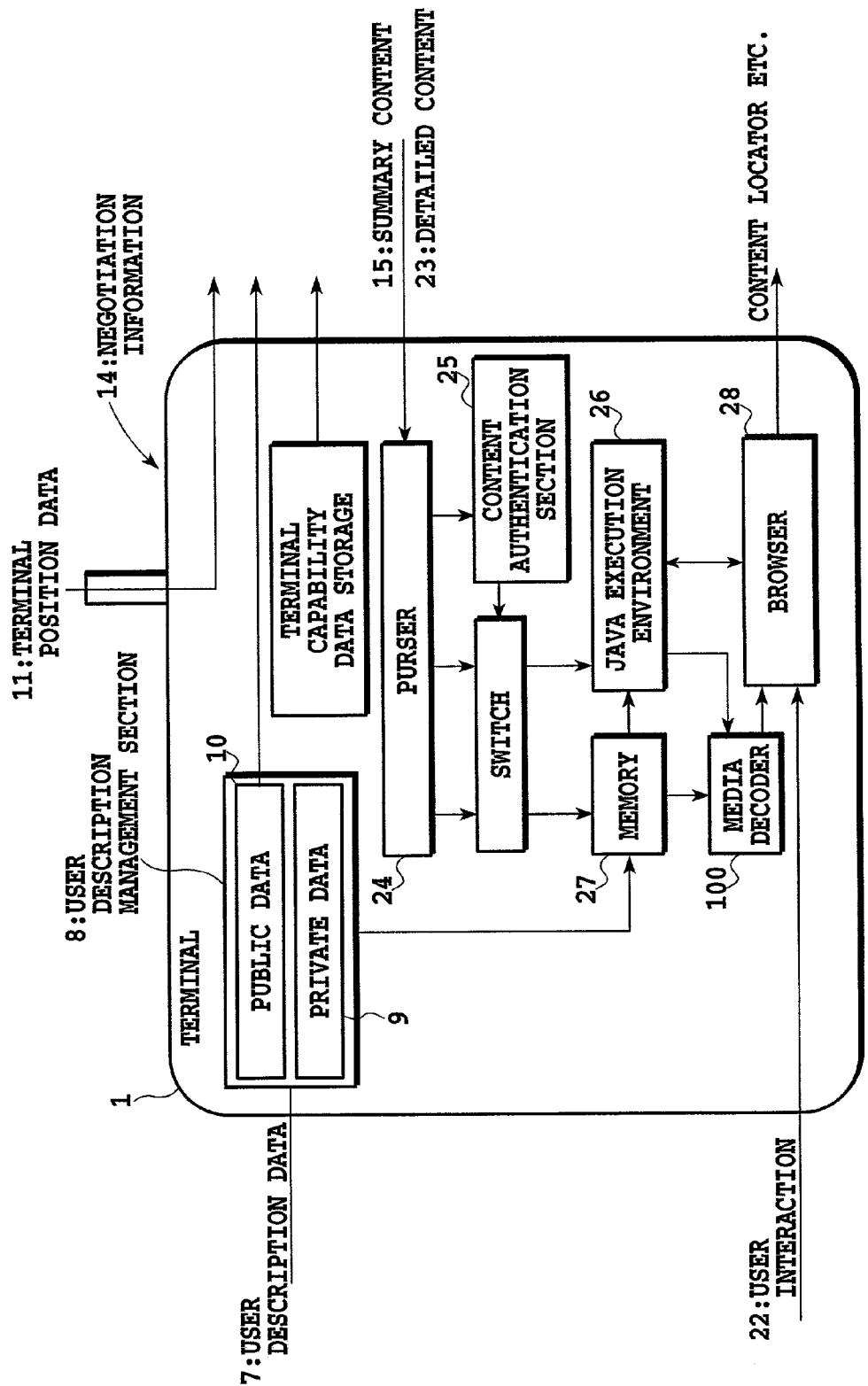
FIG. 2 is a block diagram showing a detailed internal configuration of a terminal of the embodiment in accordance with the present invention.

As described above, appropriate summary content 15 is sent to the terminal 1 in accordance with the interest and conditions of the user. Next, the pull operation of the detailed content 23 by the terminal 1 using the summary content 15 will be described with reference to a detailed internal configuration of the terminal 1 as shown in FIG. 2. Here, the detailed content 23 may be files of the foregoing full AV media, or web content description including the full AV media. The mechanism for capturing the detailed content by the pull access based on the summary content is effective in the following cases, for example.

First case: Delivering a key-frame set representing key events of sport news such as a scene of a homerun, a goal scene of a soccer game, or a pat scene in a golf game as the summary content, and delivering detailed video scene including the foregoing scenes in response to the pull request from the user. The key events can be acquired from the user description data 7, and a manner of displaying the key frames on the terminal 1 can be controlled according to the interest of the user in the key events. It is also possible to transmit information about sport events in the neighborhood of the key events according to the position of the user.

Second case: Delivering latest CD score information in the form of the key-frame set representing a video clipboard (any sources are acceptable such as music programs on television), and delivering a detailed video clipboard in response to a user request. It is also possible to handle the content reflecting the chart of the area according to the user position.

Third case: Multimedia town guidance service. Various items of town information about the neighborhood of the current user position are delivered with the video clipboard. For example, an image of entrances of restaurants in the neighborhood are push delivered as a key-frame set so that the user can visually check the inside of the restaurants as needed.

The summary content 15 is push delivered to the terminal 1 after the foregoing components are coded according to prescribed protocol and format such as HTTP, MIME or XML. The terminal 1 disassembles the summary content 15 into their components with a purser 24, first. Subsequently, a content authentication section 25 verifies the summary content 15 according to the content authentication data 20. When they are verified, the content display control code 19 operates on the Java execution environment 26 in the terminal 1 to develop the data to be used for the display such as a key frame set 17 and text data 16 on a memory 27. Image media such as the key frames are developed on the memory 27 via a special purpose media decoder 100 as needed. The content display control code 19 includes a program having layout rules for displaying the data in the memory 27 on a browser, and designs layout of the data on a browser 28. Thus, changing the program of the content display control code 19 enables a variety of display layouts that make full use of the characteristics of the push content provider. In addition, a configuration is also possible that makes the standard display control engine resident in the terminal 1 without including the content display control code 19. In this case, the transmission charge of the summary content can be reduced by an amount of skipping the transmission of the content display control code 19.

In this case, a configuration is possible which carries out the display control reflecting the interest of the user by reading the private data 9 from the user description data 7, and by developing the private data 9 on the memory 27. For example, consider the case where the received summary content 15 falls into a plurality of sub-genres such as baseball, soccer in the sport. It will be possible in this case to consider the interest of the user in the sub-genres, so that the key frames the user is most interested in among the key-frame set 17 are displayed on a priority basis. In addition, the summary content can be arranged such that they can pass through the information filtering by the private data 9 utilizing the property of the private data 9, thereby making it possible to provide information passing through two step filtering consisting of a public phase (push delivery side) and a private phase (terminal side). For example, consider the case where the private data includes age, sex and the like. In this case, the push content which is selected according to the user's interest or taste that can be made public are further selected according to the age or sex to be displayed on the receiving terminal.

Furthermore, it is necessary for the content display control code 19 to decode the AV media structure description data 18 associated with the key-frame set 17 before generating information needed for the pull operation of a user interaction 22. The AV media structure description data 18 can use MPEG-7 Summarization DS or MPEG-7 Segment DS as its format, for example. The AV media structure description data 18 store information about the key frames indicating which of them correspond to which times in the full AV media, or about the URLs (Uniform Resource Locators) of the full AV media 21 represented by the individual key frames; and various items of attribute information associated with the key frames (such as event information corresponding to the key frames, and information about subjects in the key frames). The content display control code 19 extracts and generates the following two pieces of information primarily from the AV media structure description data 18.

Locator information: The address information of the full AV media corresponding to the key frames. When the full AV media consists of a single stream file, the locator information indicates one of the times in the stream file. When the full AV media are divided into shot units corresponding to the key frames, the locator information describes their URLs. Alternatively, the locator information indicates the URL of the entire detailed web content 23 including the full AV media corresponding to the key frames.

Annotation information: Generating URLs to be used as associated links from the various attribute information associated with the key frames, or generating links with a format that can be output as keywords to a text-based web search engine.

The extracting and generating processing of the information can also be controlled using the private data 9. For example, such a configuration will be possible in which only the annotation matching the user interest can be made link information for the pull operation.

According to the foregoing configuration and process, the summary content, in which the links for the pull operation are provided in accordance with the interest of the user, is displayed on the browser 28. Using these links, the user can receive the detailed content 23 by the pull operation as needed. In the pull operation, the detailed content 23 can be received either in the download type based on the HTTP, or in the streaming type based on RTSP (Real-time Streaming Protocol).

The locator information that is sent to the pull server 4 when making the pull access from the key frames can be the URL indicating the physical location of the detailed content 23, or any time or time period in the detailed content. The former is applied to a case where the detailed content 23 is physically divided to be stored, while the latter is applied to a case where the detailed content 23 is collected into a single unit, the inside of which is accessible at random.

It is common to charge for the communications made by the terminal 1. However, there will be some cases where the user of the terminal 1 is not billed for viewing the content. Allowing the user to view the content without charge enables the user to obtain a variety items of information, while the advertisers can gain wide viewers of the content.

As a method to exempt the user from the charge for the pull access, it will be possible to utilize a one-time password. In this case, the summary content 15 can include one-time password generating trigger information so that the user can take an action for the one-time password generating trigger information at the terminal 1 to generate the one-time password. The one-time password generating trigger information is questionnaire page description data, for example. It is assumed that when the user fills out the questionnaire and transmits it, the one-time password is generated. Since the survey is closely related to the content, it is preferable that the questionnaire page description data be made for each content. Thus, it is preferable that the questionnaire page description data be included in the summary content 15. The content display control code 19 is assumed to have a one-time password function according to the one-time password generating trigger information and the user input. In this way, the user of the terminal 1 can obtain the one-time password. It is also possible to transmit the one-time password itself to the terminal 1 instead of transmitting the one-time password generating trigger information.

The pull server 4 comprises the user authentication section for receiving the one-time password and for conducting the authentication. After receiving the one-time password, the pull server 4 accepts a request from the same user for a predetermined time period (within one hour, for example), and delivers the detailed content 23 to the user sending the free request. When the one-time password is generated for each detailed content, it is possible to exempt the user from the charges for part of the detailed content corresponding to the one-time passwords rather than from the charge for the predetermined time period.

When the one-time password is not used, the charge for the pull access is tentatively levied on the user of the terminal 1. However, when the communication between the terminal 1 and the pull server 4 is completed, the pull server 4 pays the charge for the request for the detailed content 23 back to the user of the terminal 1.

Figure 5:
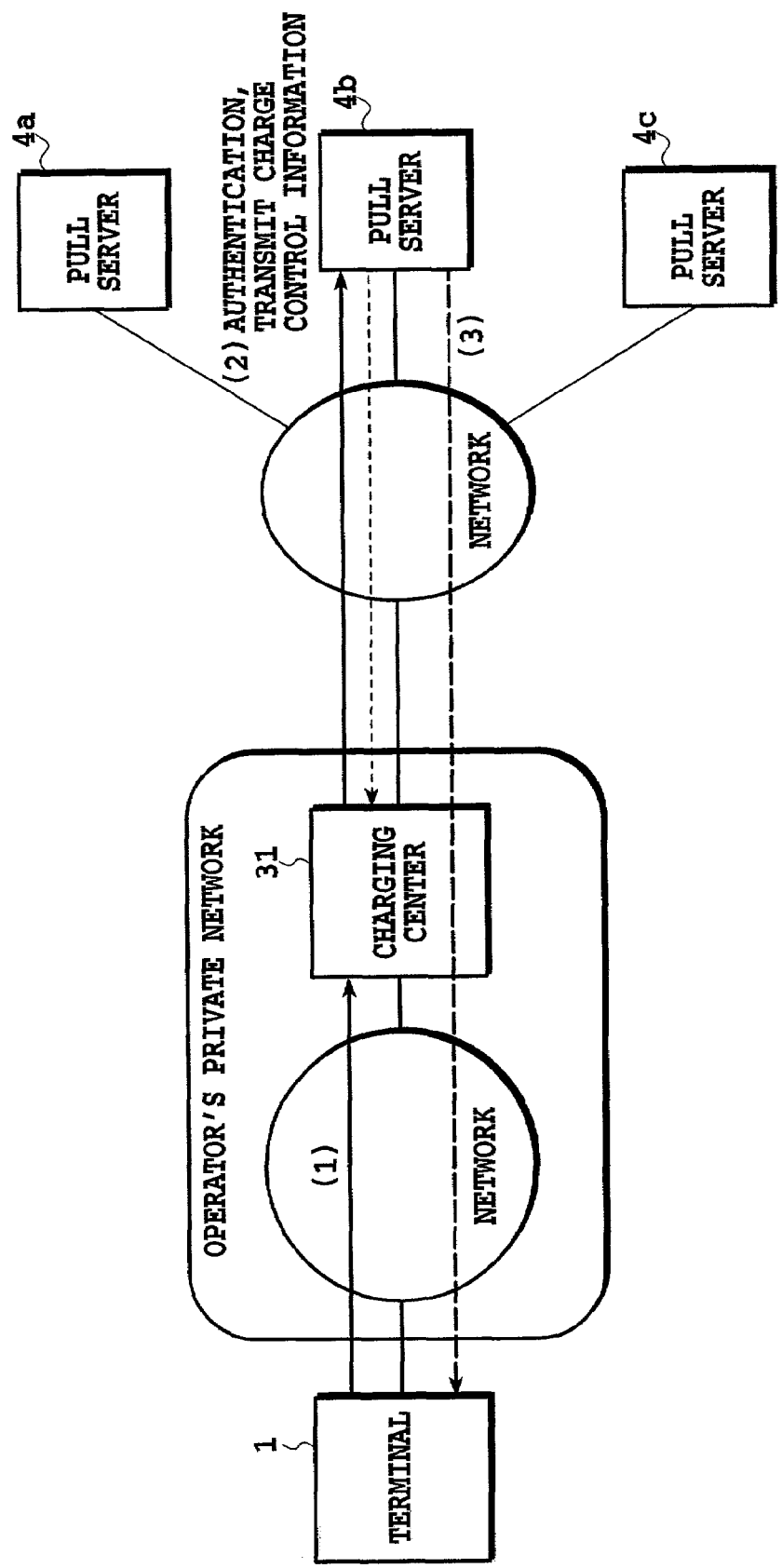
FIG. 5 is a block diagram illustrating a charging example for communications between a terminal and a pull server.

FIG. 5 is a block diagram illustrating an example of charging for the communication between the terminal and the pull server. The communication is carried out by means of packet communication, for example.

(1) A charging center 31 temporarily reserves the charging when a prescribed access scheme occurs. For example, when the access pattern takes place that the user viewing the summary content can make, the charging is reserved. Alternatively, when the communication based on the RTSP is carried out during the communication normally based on the HTTP, the charging is reserved. Furthermore, when it is found from the party address contained in the packet that the party is a specific one, the charging is reserved. Subsequently, the charging center 31 decides the charging destination according to the pull server selection information from the terminal 1, or according to the feedback information from the pull server, and starts the charging. The charging center 31 has a function of making a decision of the charging destination according to the pull server selection information (usually, the URL) from the terminal 1, which corresponds to the common access to a web server, and a function of deciding the charging destination according to the feedback information from the pull server. Only when the former makes a decision that "the pull server bears the cost", the latter operates.

(2) The pull servers 4a–4c make a decision as to whether they will bear the charge for the access (the communication with the terminal 1) according to the authentication information such as one-time password transmitted from the terminal 1, and transmits the information about the decision to the charging center 31.

(3) Receiving the instruction that the pull servers bears the charge, the charging center 31 charges the pull server for all the transmitted and received packets including the pull access from the terminal 1. In contrast, when the pull servers do not bear the charge as in common web server or unauthorized access, the charging center 13 charges the terminal 1.

The charging center can be configured such that it has an authentication function of a one-time password sent in advance from a pull server registered as a service provider, and decides the charging destination directly from the pull access. Thus, receiving an authorized one-time password from the terminal, the charging center can charge the pull server for the subsequent communications between the terminal and the pull server. In this case, although the charging center holds the authentication function for each pull server, since it becomes unnecessary to decide the charging destination by monitoring the subsequent packet streams, the load of monitoring the entire communication procedure can be reduced. In addition, as for the authentication function for each pull server, it becomes unnecessary for the charging center to prepare a plurality of authentication functions when a standard procedure is determined as a service in advance, thereby making it possible to reduce the load of implementation.

The present embodiment implements the function of enabling a user to visually check a rough outline of the detailed content 23 by providing the summary content 15 with the key-frame set 17, and by explicitly displaying it to the user using the content display control code 19. This reflects the consideration of a fact that the detailed content cannot be seen at all if the summary content is described using the page description language such as HTML, and if the user provides no explicit interaction.

The detailed content 23 corresponding to the key frame selected by the user can be delivered to the terminal 1 in such a manner that they are dynamically specified according to the view conditions the user desires by transmitting the media structure description data 18 together that describes the logical relationships between the key-frame set 17 and detailed content 23. This means that any portion of long real-time media can be selectively specified to be reproduced.

In this embodiment, the push server 3 delivers the summary content 15 to the terminal 1 by push under control of the push delivery controller 2. However, for example, it is possible to configure the push server 3 as a pull server, and make the terminal 1 send a transmission request of the summary content to the pull server to obtain the summary content.

Figure 6:
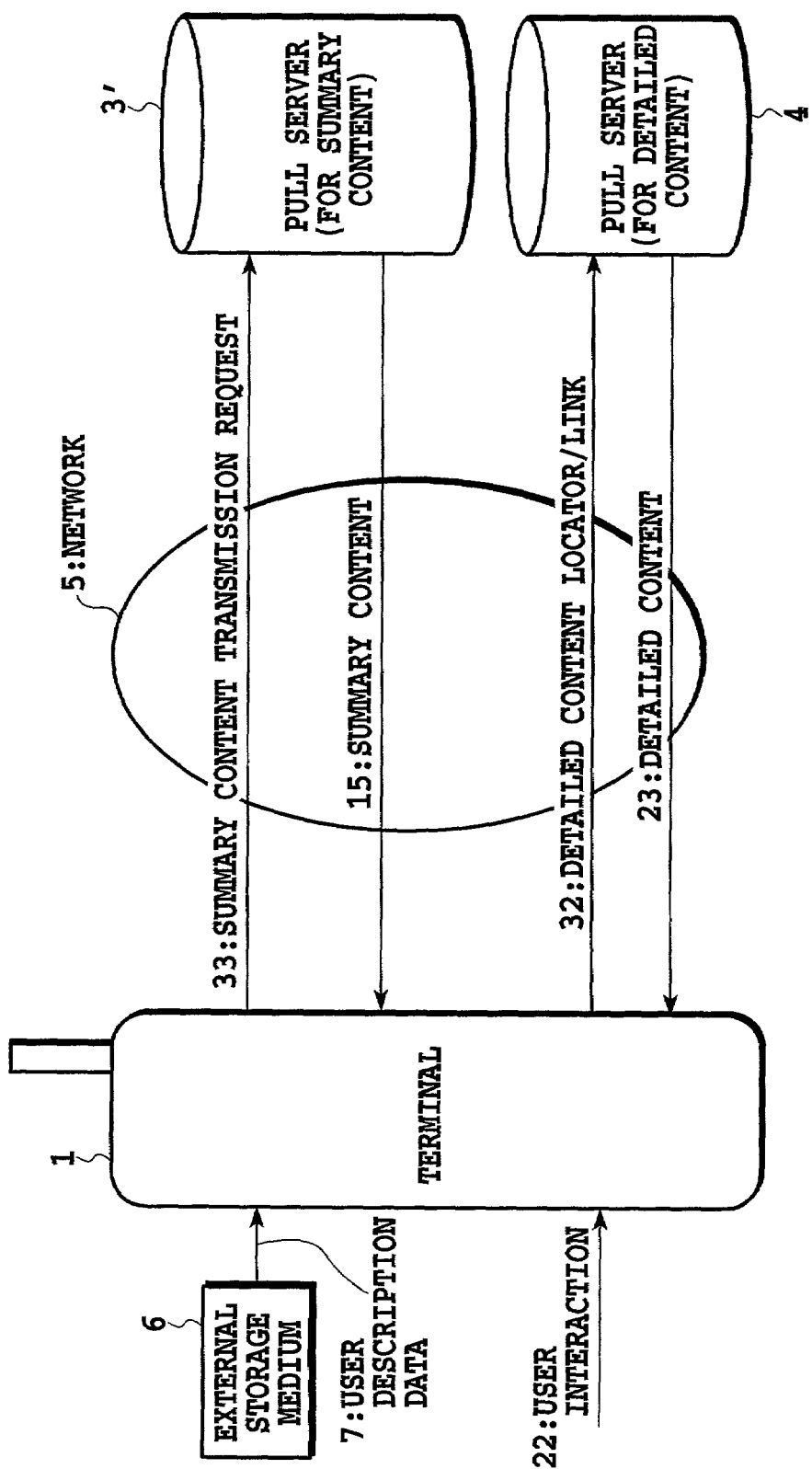
FIG. 6 is a block diagram showing another configuration of an information delivery system of an embodiment in accordance with the present invention.

FIG. 6 is a block diagram showing another configuration of the information delivery system of the embodiment in accordance with the present invention. In the configuration of FIG. 6, a pull server 3' is installed in place of the push server 3 of FIG. 1. The pull server 3' deliver the summary content 15 in response to a summary content transmission request 33. The terminal 1 can obtain the detailed content 23 in accordance with the detailed content locator/link 32.

The pull server 3' can have the function of the push delivery controller 2. The summary content transmission request 33 can include the terminal capability data 12, the user description data 7, etc. The pull server 3' can decide whether the terminal is a terminal to which the summary content should be sent based on the terminal capability data 12, the user description data 7, etc.

For example, in HTTP, description data about terminal type can be sent to the pull server 3' and by extending this mechanism, information for negotiating about transmission and reception of content can be exchanged between the terminal 1 and the pull server 3'. That is, if the terminal side uses a terminal with low display capability which accepts QCIF resolution only, the server side can consider that point and provide low resolution content.

As described above, the present invention can provide information delivery services utilizing the network resources efficiently. In addition, it enables the user to acquire multimedia web content matching his or her interest or conditions at low cost, and to receive detailed content as needed. Thus, the present invention can provide a system that can deliver the web content using AV media with high transmission cost efficiently. It also enables the service providers to introduce hierarchical charging system presupposing secondary access to the detailed content, and to achieve multimedia content delivery to a large number of users by making effective use of the network resources.

The present invention has been described in detail with respect to a preferred embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A wireless terminal comprising:
    means for transmitting data about said wireless terminal to a push delivery control unit;
    means for receiving summary content which is decided to be deliverable by said push delivery control unit from a push server for storing the summary content which is a summary of detailed content;
    means for displaying the received summary content according to data about said wireless terminal that is not transmitted to said push delivery control unit, the data differing from the data about said wireless terminal which is transmitted to said push delivery control unit;
    means for instructing a pull server to transmit the detailed content corresponding to the received summary content; and
    means for receiving the detailed content corresponding to the received summary content from said pull server.

2. The wireless terminal as claimed in claim 1, wherein said means for displaying the received summary content further displays the summary content according to a display control code for controlling display of content on said terminal.

3. The wireless terminal as claimed in claim 1, wherein the data about said wireless terminal includes data about content display capability of said wireless terminal and data about a user of said wireless terminal.

4. The wireless terminal as claimed in claim 3, wherein the data about the user of said wireless terminal consists of data which is transmitted to said push delivery control unit and data which is not transmitted to said push delivery control unit.

5. The wireless terminal as claimed in claim 1, wherein the data about said wireless terminal includes data about content display capability of said wireless terminal and data about a location of said wireless terminal.

6. The wireless terminal as claimed in claim 1, wherein the data about said wireless terminal includes data about a user of said wireless terminal and data about a location of said wireless terminal.

7. The wireless terminal as claimed in claim 6, wherein the data about the user of said wireless terminal consists of data which is transmitted to said push delivery control unit and data which is not transmitted to said push delivery control unit.

8. The wireless terminal as claimed in claim 1, wherein the data about said wireless terminal includes data about content display capability of said wireless terminal, data about a user of said wireless terminal, and data about a location of said wireless terminal.

9. The wireless terminal as claimed in claim 8, wherein the data about the user of said wireless terminal consists of data which is transmitted to said push delivery control unit and data which is not transmitted to said push delivery control unit.

10. A control method for a wireless terminal comprising the steps of:

transmitting data about said wireless terminal to a push delivery control unit;

receiving summary content which is decided to be deliverable by said push delivery control unit from a push server for storing the summary content which is a summary of detailed content;

displaying the received summary content according to data about said wireless terminal that is not transmitted to said push delivery control unit, the data differing from the data about said wireless terminal which is transmitted to said push delivery control unit;

instructing a pull server to transmit the detailed content corresponding to the received summary content; and receiving the detailed content corresponding to the received summary content from said pull server.

11. The control method for a wireless terminal as claimed in claim 10, wherein the step of displaying the received summary content further displays the summary content according to a display control code for controlling display of content on said terminal.

12. The control method for a wireless terminal as claimed in claim 10, wherein the data about said wireless terminal includes data about content display capability of said wireless terminal and data about a user of said wireless terminal.

13. The control method for a wireless terminal as claimed in claim 12, wherein the data about the user of said wireless terminal consists of data which is transmitted to said push delivery control unit and data which is not transmitted to said push delivery control unit.

14. The control method for a wireless terminal as claimed in claim 10, wherein the data about said wireless terminal includes data about content display capability of said wireless terminal and data about a location of said wireless terminal.

15. The control method for a wireless terminal as claimed in claim 10, wherein the data about said wireless terminal includes data about a user of said wireless terminal and data about a location of said wireless terminal.

16. The control method for a wireless terminal as claimed in claim 15, wherein the data about the user of said wireless terminal consists of data which is transmitted to said push delivery control unit and data which is not transmitted to said push delivery control unit.

17. The control method for a wireless terminal as claimed in claim 10, wherein the data about said wireless terminal includes data about content display capability of said wireless terminal, data about a user of said wireless terminal, and data about a location of said wireless terminal.

18. The control method for a wireless terminal as claimed in claim 17, wherein the data about the user of said wireless terminal consists of data which is transmitted to said push delivery control unit and data which is not transmitted to said push delivery control unit.

19. A push delivery control unit comprising:

means for receiving from a wireless terminal data about said wireless terminal, the wireless terminal comprising means for transmitting data about said wireless terminal to a push delivery control unit; means for receiving summary content which is decided to be deliverable by said push delivery control unit from a push server for storing the summary content which is a summary of detailed content; means for displaying the received summary content according to data about said wireless terminal that is not transmitted to said push delivery control unit, the data differing from the data about said wireless terminal which is transmitted to said push delivery control unit; means for instructing a pull server to transmit the detailed content corresponding to the received summary content; and means for receiving the detailed content corresponding to the received summary content from said pull server;

means for receiving data about the summary content from said push server;

means for deciding a wireless terminal to which the summary content is to be transmitted according to the data about said wireless terminal and the data about the summary content; and means for transmitting to said push server information about the decided wireless terminal to which the summary content is to be transmitted, and allowing said push server to transmit the summary content only to the wireless terminal to which the summary content is to be transmitted.

20. A push delivery control unit comprising:

means for receiving from a wireless terminal data about said wireless terminal, the wireless terminal comprising means for transmitting data about said wireless terminal to a push delivery control unit; means for receiving summary content which is decided to be deliverable by said push delivery control unit from a push server for storing the summary content which is a summary of detailed content; means for displaying the received summary content according to data about said wireless terminal that is not transmitted to said push delivery control unit, the data differing from the data about said wireless terminal which is transmitted to said push delivery control unit; means for instructing a pull server to transmit the detailed content corresponding to the received summary content; and means for receiving the detailed content corresponding to the received summary content from said pull server, wherein said means for displaying the received summary content further displays the summary content according to a display control code for controlling display of content on said terminal;

means for receiving data about the summary content from said push server;

means for deciding a wireless terminal to which the summary content is to be transmitted according to the data about said wireless terminal and the data about the summary content; and means for transmitting to said push server information about the decided wireless terminal to which the summary content is to be transmitted, and allowing said push server to transmit the summary content only to the wireless terminal to which the summary content is to be transmitted.

21. An information delivery system comprising:

one or more push delivery control units comprising: means for receiving from a wireless terminal data about said wireless terminal; means for receiving data about the summary content from push server; means for deciding a wireless terminal to which the summary content is to be transmitted according to the data about said wireless terminal and the data about the summary content, and means for transmitting to said push server information about the decided wireless terminal to which the summary content is to be transmitted, and allowing said push server to transmit the summary content only to the wireless terminal to which the summary content is to be transmitted, the wireless terminal comprising means for transmitting data about said wireless terminal to a push delivery control unit; means for receiving summary content which is decided to be deliverable by said push delivery control unit from a push server for storing the summary content which is a summary of detailed content; means for displaying the received summary content according to data about said wireless terminal that is not transmitted to said push delivery control unit, the data differing from the data about said wireless terminal which is transmitted to said push delivery control unit; means for instructing a pull server to transmit the detailed content corresponding to the received summary content; and means for receiving the detailed content corresponding to the received summary content from said pull server; and one or more wireless terminals as claimed in claim 1.

22. The information delivery system as claimed in claim 21 further comprising:

one or more push servers for storing one or more pieces of the summary content which is a summary of detailed content.

23. The information delivery system as claimed in claim 22 further comprising:

a pull server for storing one or more pieces of the detailed content corresponding to the summary content.

24. The information delivery system as claimed in claim 23 further comprising:

a charging center for charging for communication between said wireless terminal and said pull server.

25. An information delivery system comprising:

one or more wireless terminals, each wireless terminal comprising means for transmitting data about said wireless terminal to a push delivery control unit; means for receiving summary content which is decided to be deliverable by said push delivery control unit from a push server for storing the summary content which is a summary of detailed content; means for displaying the received summary content according to data about said wireless terminal that is not transmitted to said push delivery control unit, the data differing from the data about said wireless terminal which is transmitted to said push delivery control unit; means for instructing a pull server to transmit the detailed content corresponding to the received summary content; and means for receiving the detailed content corresponding to the received summary content from said pull server, wherein said means for displaying the received summary content further displays the summary content according to a display control code for controlling display of content on said terminal; and one or more push delivery control units comprising: means for receiving from at least one of the wireless terminals data about said wireless terminal; means for receiving data about the summary content from said push server; means for deciding a wireless terminal to which the summary content is to be transmitted according to the data about said wireless terminal and the data about the summary content; and means for transmitting to said push server information about the decided wireless terminal to which the summary content is to be transmitted, and allowing said push server to transmit the summary content only to the wireless terminal to which the summary content is to be transmitted.

26. The information delivery system as claimed in claim 25 further comprising:

one or more push servers for storing the summary content which is a summary of detailed content.

27. The information delivery system as claimed in claim 26 further comprising:

a pull server for storing one or more pieces of the detailed content corresponding to the summary content.

28. The information delivery system as claimed in claim 27 further comprising: a charging center for charging for communication between said wireless terminal and said pull server.

29. A computer-readable storage medium having thereon computer-executable instructions that are structured such that, when executed by one or more processors of a computing system, cause the computing system to perform a control method comprising the steps of:

transmitting data about said wireless terminal to a push delivery control unit;

receiving summary content which is decided to be deliverable by said push delivery control unit from a push server for storing the summary content which is a summary of detailed content;

displaying the received summary content according to data about said wireless terminal that is not transmitted to said push delivery control unit, the data differing from the data about said wireless terminal which is transmitted to said push delivery control unit;

instructing a pull server to transmit the detailed content corresponding to the received summary content; and receiving the detailed content corresponding to the received summary content from said pull server.

* * * * *

UNITED STATES PATENT AND TRADEMARK OFFICE
CERTIFICATE OF CORRECTION

PATENT NO. : 7,200,633 B2  
APPLICATION NO. : 09/935889  
DATED : April 3, 2001  
INVENTOR(S) : Sekiguchi et al.

Page 1 of 1

It is certified that error appears in the above-identified patent and that said Letters Patent is hereby corrected as shown below:

Title Page  
Page 2, OTHER PUBLICATIONS, add the following reference:  
--Official Notice of Rejection (Translation) Case No.: DCMH130241 Patent Application No:2001-256659--

Column 7  
Line 33, change "10" to --7--  
Line 45, change "10" to --7--

Column 11  
Line 29, remove "21"

Signed and Sealed this

Twentieth Day of November, 2007

JON W. DUDAS  
*Director of the United States Patent and Trademark Office*

UNITED STATES PATENT AND TRADEMARK OFFICE
CERTIFICATE OF CORRECTION

PATENT NO. : 7,200,633 B2  
APPLICATION NO. : 09/935889  
DATED : April 3, 2007  
INVENTOR(S) : Sekiguchi et al.

Page 1 of 1

It is certified that error appears in the above-identified patent and that said Letters Patent is hereby corrected as shown below:

Title Page
Page 2, OTHER PUBLICATIONS, add the following reference:
--Official Notice of Rejection (Translation) Case No.: DCMH130241 Patent Application No:2001-256659--

Column 7
Line 33, change "10" to --7--
Line 45, change "10" to --7--

Column 11
Line 29, remove "21"

This certificate supersedes Certificate of Correction issued November 30, 2007.

Signed and Sealed this

Twenty-fifth Day of December, 2007

JON W. DUDAS
*Director of the United States Patent and Trademark Office*